United States Patent Office 3,560,401
Patented Feb. 2, 1971

3,560,401
PERSISTENT ANTIFOAM COMPOSITIONS AND METHODS OF MAKING SAME UTILIZING BASIC MATERIALS
Matthew J. O'Hara, Spring Valley, and Donald R. Rink, Yorktown Heights, N.Y., assignors to Union Carbide Corporation, a corporation of New York
No Drawing. Filed Aug. 11, 1967, Ser. No. 659,870
Int. Cl. B01d 19/04
U.S. Cl. 252—358                                    17 Claims

ABSTRACT OF THE DISCLOSURE

Antifoam compositions having persistent effectiveness especially in aqueous alkaline medium, said compositions being a mixture resulting from heating a poly(diorganosiloxane) liquid, a finely divided inorganic filler, such as, silica, aluminum oxide and titanium dioxide, and a basic material, such as, alkali metal and alkaline earth metal oxides, hydroxides, alkoxides, aryloxides and silanolates, tetraalkylammonium hydroxides, alkoxides and silanolates, tetraalkylphosphonium hydroxides, alkoxides and silanolates, trialkylhydrazinium hydroxides, alkoxides and silanolates, and trialkylguanidinium hydroxides, alkoxides, and silanolates, and monoalkyl, dialkyl and trialkyl amines. Also, alkaline aqueous liquids, e.g., synthetic rubber latices, containing such novel antifoam compositions.

Processes for producing such persistent antifoam compositions by heating the poly(dimethylsiloxane) liquid in the presence of the finely divided inorganic filler and the basic material as above illustrated at a temperature in a broad range, for example, 100 to 300° C., for a period of time in a broad range, e.g., one-half to five hours. Also, processes for suppressing foam over long periods utilizing such novel antifoam compositions.

---

This invention relates to novel antifoam agents which are particularly characterized in retaining their effectiveness in alkaline systems over long periods of time. The invention also relates to novel methods for preparing such antifoam agents and to aqueous alkaline systems containing same.

It is well known that many antifoams which perform well at the instant of addition or for a short period after addition lose control after a longer period of contact with the foaming system. When antifoams are used as processing aids where short term control is needed, such as in the packaging of liquid products, this property is of little interest. However, in cases where foam is a problem throughout the production and use of the product, antifoam persistence is extremely important. The compounding and application of latex-based carpet backing is a case in point. Foam control is needed during the compounding of the raw latex with fillers and modifying additives. The compounded latex is then sold as a ready-to-use material to carpet manufacturers who may use such compounded latices within a few days, several weeks or several months after the compounding operation. Ordinarily, such carpet manufacturers use the compounded latex without further antifoam addition. Consequently, it is imperative that the antifoam action of the composition persist throughout the compounding, shipment and storage, as well as throughout the application steps.

Various methods have been proposed in the past for overcoming the loss of foaming control when the organosiloxane polymer antifoam agents are exposed to alkaline aqueous foaming systems. For example, reference is made to United States Pat. 3,113,930 wherein it is proposed that the finely divided filler such as silica be treated with a liquid methyl polysiloxane prior to mixing with the organosiloxane polymer in the preparation of the antifoam agent. In this patented process, silica is heated for several hours with a low molecular weight methyl polysiloxane such as octamethylcyclotetrasiloxane and after this prolonged treatment the resulting mixture is allowed to cool. Thereafter it is mixed with a dimethylsiloxane polymeric liquid and heated for a prolonged period of time such as 16 hours at 200° C. The treatment described by this patent is obviously time-consuming and involves heating and cooling cycles which are very costly.

Another proposal for stabilizing organosiloxane polymer antifoam agents is described in United States Pat. 3,235,509. This process utilizes an acid condensation catalyst, such as, aluminum chloride, ferric chloride and other metal halides, as well as sulfuric acid which is stated to be not preferred over the above-mentioned halides. The acid nature of the catalyst employed imposes the risk of corrosion to processing equipment as well as metallic containers for the resulting antifoam material. Moreover, if the acidic materials are not removed from the antifoam material there is a risk of equilibration of the organosiloxane polymer contained by the antifoam material during and after the heating step, resulting in the production of volatile, low molecular weight siloxane polymers, the evaporation of which can result in viscosity increase thus complicating the compounding and use of the antifoam material with other substances.

The present invention is based on the discovery that antifoam compositions comprising organosiloxane polymers and inorganic fillers such as silica can be stabilized against the action of aqueous alkaline foaming media without the necessity of heating and cooling cycles and without the necessity of removing or otherwise neutralizing the effects of materials employed to impart stabilization or by-product materials resulting therefrom. In accordance with this invention, persistent antifoam compositions are obtained by heating mixtures of organosiloxane polymeric liquids in the presence of finely divided inorganic filler materials, such as silica, and a basic material, such as, potassium silanolate, potassium hydroxide, trialkyl amine, etc.

The organosiloxane polymers employed in this invention can be any of the well known types heretofore employed in the preparation of antifoam compositions. The polymers generally have hydrocarbon groups bonded to silicon in the ratio of about 1.8 to about 2.2 hydrocarbon groups per silicon atom. Most preferably, the hydrocarbon group is methyl and the basic unit of the polymer is the dimethylsiloxane unit which constitutes at least 65 mol percent and preferably 97.0 mol percent or more of the siloxane polymer. Other units can be present, such as trimethylsiloxane units which can be present in amounts up to 25 mol percent of the polymer, more preferably, .5 to 3 mol percent of the polymer. In addition, the polymer can contain still other units, such as, monomethylsiloxane units and unsubstituted siloxane units, i.e., $SiO_{4/2}$, in minimum amounts of less than 10 mol percent and preferably below .2 mol percent of the siloxane polymer. Preferred organosiloxane polymers are the trimethylsiloxy end-blocked dimethylsiloxane polymers having the formula $Me_3SiO(Me_2SiO)_nSiMe_3$ wherein Me designates the methyl group and $n$ is an integer. The organosiloxane polymer employed herein has a viscosity in the range of about 5 to about 100,000 centistokes measured at 25° C. and, preferably, 5 to 1,000 centistokes. Thus, the value of the integer $n$ is such that the siloxane polymer possesses a viscosity within the above-mentioned broad or preferred range.

The finely divided inorganic fillers employed in this invention are finely powdered materials, such as, aluminum oxide, titanium dioxide and, preferably, finely divided silicas, such as, precipitated, arc or fumed silica. The filler, preferably, has an average particle diameter of about 7 to about 25 millimicrons and, preferably, in the range of about 7 to about 12 millimicrons. A typical precipitated silica is one having a silica content on an anhydrous basis of 98%, a surface area of 300 m.²/g., a pH of 8.5 and a particle size of 13 millimicrons. A typical pyrogenic silica has a silica content of 99.8%, a surface area of 325 m.²/g., a pH of 3.9 and an average particle size of about 7 millimicrons.

The basic material employed herein is any of the well known basic catalysts employed for rearrangement of siloxanes and includes such materials as alkali metal and alkaline earth metal oxides, hydroxides, alkoxides, aryloxides and silanolates, tetraalkylammonium hydroxides, alkoxides and silanolates, tetraalkylphosphonium hydroxides, alkoxides and silanolates, trialkylhydrazinium hydroxides, alkoxides and silanolates, trialkylguanidinium hydroxides, alkoxides and silanolates, and monoalkyl, dialkyl and trialkyl amines. Typical examples of basic materials of this type include sodium, potassium, magnesium, calcium, strontium and cesium hydroxides, sodium, potassium, magnesium, calcium and cesium oxides, sodium, potassium, magnesium, calcium and cesium methoxides, ethoxides, phenoxides and butoxides, sodium, potassium, magnesium, calcium and cesium salts of methylsilanetriol, dimethylsilanediol, and phenylsilanetriol, tetramethylammonium hydroxides, tetraethylammonium hydroxides, phenyltrimethylammonium hydroxides, triethyloctadecylammonium hydroxides, benzyltrimethylammonium hydroxides, cyclohexyltributylammonium hydroxides, vinyltrimethylammonium hydroxides, benzyl betahydroxyethyldimethylammonium hydroxides, tolyltriethylammonium hydroxides, tris-(beta-hydroxyethyl)methylammonium hydroxide, 12-hydroxyoctadecyltrimethylammonium hydroxides, hydroxyphenyltriethylammonium hydroxide, hydroxycyclohexyltributylammonium hydroxides, hydroxyphenylhydroxyethyldimethylammonium hydroxide, hydroxyphenylbenzyldibutylammonium hydroxide, tetramethyl phosphonium hydroxide, tetraethyl phosphonium hydroxide, tetra-n-butyl phosphonium hydroxide, dimethyldiethyl phosphonium hydroxide, phenyltrimethyl phosphonium hydroxide, butyltricyclohexyl phosphonium hydroxide, tetramethyl phosphonium methoxide, tetrabutyl phosphonium butoxide, etc., many examples of such quaternary phosphorium compounds being more particularly disclosed in U.S. Pat. 2,883,366, issued Apr. 21, 1959, trimethylhydrazinium hydroxide, methoxide, n-butoxide and dimethylsilanolate, tri-n-butylhydrazinium hydroxide, ethoxide and phenylsilanolate, triethylguanidinium hydroxide, propoxide and methylsilanolate, di-n-butylamine, di-n-hexylamine and ethylenediamine and the like. Preferably the alkaline catalysts, which contain carbon, contain no more than 18 carbon atoms. Preferred basic materials are potassium silanolate and potassium hydroxide.

The amounts of the organosiloxane polymer, the inorganic filler and the basic material mixed and heated together are not narrowly critical. Typical ranges of amounts of these respective materials include about 70 to about 99.49 weight percent of the organosiloxane polymer, about 0.5 to about 30 weight percent of the inorganic filler and about 0.01 to about 1.0 weight percent of the basic material.

The antifoam compositions of this invention are prepared by blending the three above-mentioned materials together and heating them at an elevated temperature which is not narrowly critical. Typically, the elevated temperature can be about 100 to about 300° C., preferably about 130 to 250° C. The period of heating likewise is not narrowly critical and, for example, can range from one-quarter hour to five hours, preferably, one-half hour to two hours. If desired, the mixture can be mildly agitated during the heating operation. After the heating operation the mixture need not be further processed in any way, that is, no additional operations are necessary to remove, neutralize or otherwise destroy the activity of the basic material or any by-products resulting from the heating step. The resulting heated mixture is suitable for antifoam use subsequent to the heating step and may be so used or packaged for shipment. It is possible, however, to subject the resulting heated mixture to further processing as desired for providing any additional or special effects which may be required or desired.

The following examples are presented to illustrate the invention. Unless otherwise indicated, all parts and percentages are by weight and all temperatures are on the centigrade scale.

EXAMPLE 1

100 parts dimethylpoylsiloxane having a viscosity of 500 cst. at 25° C., and 3 parts of finely divided fumed amorphous silica having an average particle size of 7 millimicrons and a surface area of 325 m.²/g. were blended together. Into this blend, 0.1 part of a 50% aqueous solution of potassium hydroxide solution was well dispersed. The resulting mixture was heated to 150° C. and maintained at that temperature for a period of 5 hours.

Into a 100 cc. graduate, were placed 49.9 g. of a 48% solids aqueous carboxylated styrene-butadiene rubber latex having a pH of 10.5, a viscosity of 11 cps. at 25° C., a specific gravity of 1.005 and a surface tension of 37.5 dynes/cm. at 25° C. and 0.1 g. of a suspension of 1.0 g. of the above antifoam composition in 9.0 g. polypropylene glycol diluent having an average molecular weight of approximately 1950 to 2100 and a specific gravity of 1.0048.

The total volume of liquid was noted, a stopper placed in the graduate and the graduate shaken vigorously up and down twenty-five times (each change of direction equals one shake). After standing for 1 minute, the total volume of liquid and foam was recorded. The volume of foam was determined by subtracting the original liquid volume from the total volume after shaking and this was recorded as initial foam. The stoppered graduate was then stored at room temperature for one week and again shaken to determine the foam volume after aging. It was found that the antifoam prepared in this example allowed the formation of 5 cc. of foam initially and 9 cc. of foam after aging.

A similar dimethylpolysiloxane-filler dispersion heated to 150° C. for 36 hours without the aqueous potassium hydroxide catalyst allowed the formation of 6 cc. of foam initially and 15 cc. after aging, when tested as above. A similar dispersion prepared without heating and without the catalyst gave 3 cc. initially and 21 cc. after aging, when tested as above.

If only the polypropylene glycol diluent is added to the latex the foam volume is 15 cc. initially and 27 cc. after aging only 2 days. The latex with no diluent or antifoam additives yields from 35–40 cc. of foam initially and after aging.

EXAMPLE 2

Using the procedure of Example 1, but substituting 0.04% K+ as potassium silanolate for the aqueous KOH, and heating to 150° C. for 5 hours provided a poly(dimethylsiloxane)-filler dispersion which, when mixed with the diluent and then the latex and tested in accordance with Example 1, provided foam suppression to the extent of 3 cc. foam initially and 8 cc. of foam after aging for one week. After aging for three weeks, the composition provided foam suppression to the extent of about 9 cc. foam.

When the same dispersion was made using 400 p.p.m. of potassium as potassium silanolate and heated and held for one hour at 150° C., substantially the same antifoam activity in the latex is exhibited initially and after aging one week, when tested as above.

EXAMPLE 3

Using the procedure of Example 1, but using 0.1% diethyl amine catalyst instead of aqueous KOH, and heating to 150° C. for 5 hours gave an antifoam which when mixed with the diluent and then the latex and tested in accordance with Example 1, provided foam suppression to the extent of 6 cc. of foam initially and 11 cc. after aging for one week.

The results of the above examples are summarized in the following table.

TABLE I

| Ex. | Catalyst | Temperature and heating time | Foam volume generated (cc.) | |
|---|---|---|---|---|
| | | | Initially | After aging (1 week) |
| | None | None | 3 | 21 |
| | None | 150° C., 36 hrs | 6 | 15 |
| 1 | 0.1% (50% aq. KOH) | 150° C., 5 hrs | 5 | 9 |
| 2 | 0.04% K silanolate | 150° C., 5 hrs | 3 | 8 |
| | | 150° C., 1 hr | 3 | 8 |
| | | 150° C., 15 mins | 2 | 9 |
| 3 | 0.1% diethyl amine | 150° C., 5 hrs | 6 | 11 |

Similar persistent antifoam compositions are made in the manner described in Example 1 wherein KOH is substituted with an equivalent amount of respectively monoethyl amine, triethyl amine, NaOH, CeOH, KOMe, potassium phenoxide, potassium oxide, potassium phenylsilanolate, potassium dimethyl silanolate, tetramethylammonium hydroxide, phenyltrimethylammonium hydroxide, cyclohexyltributylammonium hydroxide, vinyltrimethylammonium hydroxide, benzyl beta-hydroxyethyldimethylammonium hydroxide, hydroxyphenyltriethylammonium hydroxide, hydroxycyclohexyltributylammonium hydroxide, hydroxyphenylbenzyldibutylammonium hydroxide, tetramethyl phosphonium hydroxide, phenyltrimethyl phosphonium hydroxide, butyltricyclohexyl phosphonium hydroxide, tetramethyl phosphonium methoxide, trimethylhydrazinium hydroxide, methoxide, n-butoxide and dimethylsilanolate, and triethylguanidinium hydroxide, propoxide and methylsilanolate.

This invention precludes the necessity for the removal or taking special measures for the destruction of the basic catalyst since little or no equilibration of the bulk of the organosiloxane polymer takes place during or after the heating step. This was demonstrated by heating the reaction mixture of Example 2 above in a vacuum at 135° C. for 4 hours. The loss of weight was less than 0.5% and was identical to that of a similar blend heated under the same conditions but without any catalyst. This indicates that there is no significant equilibration of the bulk of the organosiloxane polymer and that, in this system, the basic catalyst, e.g., potassium silanolate, is inactive as an equilibration catalyst in the bulk of the system. If equilibration had occurred, a greater weight loss due to the formation and volatilization of low molecular weight cyclic siloxanes would have resulted. Moreover, water extracts of the antifoam composition were shown to be neutral to slightly acid indicating the absence of active basic catalyst. Apparently, the basic catalyst acts only at the organosiloxane polymer-filled interface where the basic catalyst is probably adsorbed by the silica filler. The novel compositions of this invention, therefore, are stable to equilibraiton alone at temperatures up to 135° C.

The antifoam compositions of this invention because of their longer term persistence in foaming systems having alkaline pH are useful in many applications, for example, the preparation and use of alkaline aqueous liquids, such as, paints, latex systems, cleaning compounds, and laundry and detergent products wherein foaming is not desired. The antifoam compositions can be employed, as such, or in the form of aqueous emulsions, for example, containing 10% or less to 30% or more by weight of said composition. The amount of antifoam compositions employed in alkaline aqueous liquids, including those mentioned above, can be varied from 0.001 to 5.0 weight percent. The antifoam compositions can be added to dry materials, such as laundry powders, in the form of dispersions in organic solvent or water followed by drying to provide foam-depressed powders.

The process of suppressing foam, according to this invention, therefore, comprises, maintaining the alkaline aqueous liquid, such as those listed above, in the presence of the novel antifoam composition for at least one week, or for as much as one month to one year.

What is claimed is:

1. An antifoam composition having persistent effectiveness in an aqueous alkaline medium, said composition consisting essentially of the product resulitng from heating at a temperature of about 100° to about 300° C. for a period of at least one-quarter hour a mixture consisting essentially of (A) about 70 to about 99.49 weight percent of an organosiloxane polymer having a viscosity of about 5 to about 100,000 centistokes measured at 25° C. and having an average ratio of about 1.8 to about 2.2 hydrocarbon groups per silicon atom; (B) about 0.5 to about 30 weight percent of finely divided inorganic filler selected from the class consisting of silica, aluminum oxide and titanium dioxide having a particle size of about 7 millimicrons to about 25 millimicrons; and (C) about 0.01 to about 1.0 weight percent of a basic material selected from the class consisting of alkali metal and alkaline earth metal oxides, hydroxides, alkoxides, aryloxides, and silanolates, tetraalkylammonium hydroxides, alkoxides and silanolates, tetraalkylphosphonium hydroxides, alkoxides and silanolates, trialkylhydrazinium hydroxides, alkoxides and silanolates, trialkylguanidinium hydroxides, alkoxides and silanolates and monoalkyl, dialkyl and trialkyl amines.

2. A composition as defined in claim 1, wherein said organosiloxane polymer is a poly(dimethylsiloxane) oil.

3. A composition as defined in claim 2, wherein said filler is silica.

4. A composition as defined in claim 3, wherein said basic material is potassium silanolate.

5. A composition as defined in claim 3, wherein said basic material is potassium hydroxide.

6. A composition as defined in claim 3, wherein said basic material is diethyl amine.

7. A composition as defined in claim 1, wherein said basic material is selected from the class consisting of alkali metal oxides, hydroxides, alkoxides, aryloxides and silanolates.

8. A composition as defined in claim 1, wherein said basic material is selected from the class consisting of alkaline earth metal oxides, hydroxides, alkoxides, aryloxides and silanolates.

9. A composition as defined in claim 1, wherein said basim material is selected from the class consisting of tetraalkylammonium hydroxides, alkoxides and silanolates.

10. A composition as defined in claim 1, wherein said basic material is selected from the class consisting of monoalkyl, dialkyl, and trialkyl amines.

11. A process for preparing an antifoam composition having persistent effectiveness in an aqueous alkaline medium comprising the steps of heating at a temperature in the range of about 100 to about 300° C. for a period of at least one-quarter hour, a mixture consisting essentially of (A) about 70 to about 99.49 weight percent of an organosiloxane polymer having a viscosity of about 5 to about 100,000 centistokes measured at 25° C. and having an average ratio of about 1.8 to about 2.2 hydrocarbon groups per silicon atom; (B) about 0.5 to about 30 weight percent of finely divided inorganic filler selected from the class consisting of silica, aluminum oxide and titanium dioxide having a particle size of about 7 millimicrons to about 25 millimicrons; and (C) about 0.01 to about 1.0 weight percent of a basic material selected from the class consisting of alkali metal and alkaline earth metal oxides, hydroxides, alkoxides, aryloxides, and silanolates, tetraalkylammonium hydroxides, alkoxides and silanolates, tetraalkylphosphonium hydroxides, alkoxides and silanolates, trialkylhydrazinium hydroxides, alkoxides and silanolates, trialkylguanidinium hydroxides, alkoxides and silanolates and monoalkyl, dialkyl and trialkyl amines.

12. A process as defined in claim 11, wherein said mixture is agitated during the heating operation.

13. A process as defined in claim 12, wherein said organosiloxane polymer is a poly(dimethylsiloxane) liquid.

14. A process as defined in claim 13, wherein said filler is silica.

15. A process as defined in claim 14, wherein said basic material is potassium silanolate.

16. A process as defined in claim 14, wherein said basic material is potassium hydride.

17. A process as defined in claim 14, wherein said basic material is diethyl amine.

References Cited

UNITED STATES PATENTS 3,455,839   7/1969   Rauner _____ 252—358

FOREIGN PATENTS 1,047,470   11/1966   Great Britain.

JOHN D. WELSH, Primary Examiner

U.S. Cl. X.R.

252—321

PO-1050
(5/69)

UNITED STATES PATENT OFFICE
CERTIFICATE OF CORRECTION

Patent No. 3,560,401          Dated February 2, 1971

Inventor(s) M.J. O'Hara and D.R. Rink

It is certified that error appears in the above-identified patent and that said Letters Patent are hereby corrected as shown below:

In column 6, line 13 (i.e. claim 1, line 3) the term "resuliting" should read --- resulting ---.

In column 6, line 53 (i.e. claim 9, line 2) the term "basim" should read --- basic ---.

In column 7, last line (i.e. claim 16, line 2) the term "hydride" should read--- hydroxide---.

Signed and sealed this 20th day of April 1971.

(SEAL)
Attest:

EDWARD M. FLETCHER, JR.          WILLIAM E. SCHUYLER, JR.
Attesting Officer          Commissioner of Patents